US012618815B2

(12) United States Patent
Yu et al.

(10) Patent No.: US 12,618,815 B2
(45) Date of Patent: May 5, 2026

(54) ATMOSPHERIC AEROSOL INORGANIC AND ORGANIC NITROGEN QUANTIFICATION METHOD AND SYSTEM

(71) Applicant: The Hong Kong University of Science and Technology, Hong Kong (CN)

(72) Inventors: Jianzhen Yu, Hong Kong (CN); Xu Yu, Hong Kong (CN); Jinjian Li, Hong Kong (CN); Qianfeng Li, Riverside, CA (US); Xiaohui Huang, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 883 days.

(21) Appl. No.: 17/960,133

(22) Filed: Oct. 5, 2022

(65) Prior Publication Data

US 2023/0107753 A1     Apr. 6, 2023

Related U.S. Application Data

(60) Provisional application No. 63/252,179, filed on Oct. 5, 2021.

(51) Int. Cl.
*G01N 31/22* (2006.01)
*G01N 21/76* (2006.01)

(52) U.S. Cl.
CPC .......... *G01N 31/223* (2013.01); *G01N 21/76* (2013.01)

(58) Field of Classification Search
CPC .... G01N 31/223; G01N 31/227; G01N 31/12; G01N 21/76; G01N 1/2205; G01N 15/06;
(Continued)

(56) References Cited

U.S. PATENT DOCUMENTS 9,804,138 B2     10/2017  Brown et al.
2003/0040120 A1*  2/2003  Allen ................... G01N 1/2205
                                                                  422/78
2009/0120212 A1*  5/2009  Hargrove ........... G01N 33/0037
                                                                  73/863.11

FOREIGN PATENT DOCUMENTS

CN      112857961 A      5/2021
JP      2015161502 A  *  9/2015
JP      6313609 B2      4/2018

OTHER PUBLICATIONS

Yu et al. Environmental Science and Technology, vol. 55, pp. 11579-11589, Aug. 16, 2021.*

(Continued)

*Primary Examiner* — Maureen Wallenhorst
(74) *Attorney, Agent, or Firm* — IDEA Intellectual Limited; Sam T. Yip

(57)                ABSTRACT

A method of atmospheric inorganic and organic nitrogen quantification is disclosed. The ambient air is sampled by drawing it through an inlet followed by a denuder to reduce positive artifacts. After artifact removal, the air sample is collected onto a filter. The filter is subjected to thermal evolution under stepwise temperature program to generate a gaseous product mixture. In the presence of oxygen-containing carrier gas, the gaseous product mixture is oxidized to form oxidized gaseous products of $CO_2$ and nitrogen oxides. Then, the nitrogen oxides products are processed to form an NO product and reacted with ozone to form an excited $NO_2^*$ molecule. By quantifying the intensity of fluorescence, the concentration of $NO_2^*$ molecule is measured, which determines the nitrogen content in the aerosol sample. The differentiation of inorganic and organic nitrogen is achieved through processing the thermally evolved carbon and nitrogen signals using multivariate curve resolution data treatment.

16 Claims, 14 Drawing Sheets

(58) Field of Classification Search

CPC .......... G01N 2015/0046; Y10T 436/17; Y10T
436/176152; Y10T 436/177692; Y10T
436/179228; Y10T 436/204998; Y10T
436/206664; Y10T 436/25; Y10T
436/25375; Y10T 436/25875

USPC ........ 436/106, 114, 116, 118, 133, 135, 145,
436/147, 157, 158, 164, 172, 174, 177,
436/181; 422/78, 80, 82.08, 83, 93, 527,
422/534, 537

See application file for complete search history.

(56) References Cited

OTHER PUBLICATIONS

James J. Elser et al., "Global analysis of nitrogen and phosphorus limitation of primary producers in fresh water, marine and terrestrial ecosystems," Ecology Letters, 2007, pp. 1135-1142.

Nicolas Gruber et al., "An Earth-system perspective of the global nitrogen cycle," Nature, 2008, pp. 293-296, vol. 451.

Mark E. Fenn et al., "Nitrogen Excess in North American Ecosystems: Predisposing Factors, Ecosystem Responses, and Management Strategies," Ecological Applications, 1998, pp. 706-733.

S.E. Cornell et al., "Organic nitrogen deposition on land and coastal environments: a review of methods and date," Atmospheric Environment, 2003, pp. 2173-2191.

Kristina M. Russel et al., "Phase partitioning and dry deposition of atmospheric nitrogen at the mid-Atlantic U.S. coast," Journal of Geophysical Reearch, 2003, pp. 1-16, vol. 108.

Deborah A. Bronk et al., "Total dissolved nitrogen analysis: comparisons between the persulfate, UV and high temperature oxidation methods," Marine Chemistry, 2000, pp. 163-178.

Kimberly A. Mace et al., "On the use of UV photo-oxidation for the determination of total nitrogen in rainwater and water-extracted atmospheric aerosol," Atmospheric Environment, 2002, pp. 5937-5946.

Xu Yu et al., "Enhanced Wet Deposition of Water-Soluble Organic Nitrogen During the Harvest Season: Influence of Biomass Burning and In-Cloud Scavenging," Journal of Geophysical Research: Atmospheres, 2020, pp. 1-13.

Timothy Lesworth et al., "Aerosol organic nitrogen over the remote Atlantic Ocean," Atmospheric Environment, 2010, pp. 1887-1893.

Maria Tsagkaraki et al., "Spatiotemporal variability and sources of aerosol water-soluble organic nitrogen (WSON), in the Eastern Mediterranean," Atmospheric Environment, 2021, pp. 1-12.

Y. Miyazaki et al., "Latitudinal distributions of organic nitrogen and organic carbon in marine aerosols over the western North Pacific," Atmospheric Chemistry and Physics, 2011, pp. 3037-3049.

C. M. Pavuluri et al., "Atmospheric chemistry of nitrogenous aerosols in northeastern Asia: biological sources and secondary formation," Atmospheric Chemistry and Physics, 2015, pp. 9883-9896.

Hemraj Bhattarai et al., "Nitrogen Speciation and Isotopic Composition of Aerosols Collected at Himalayan Forest (3326 m a.s.l.): Seasonality, Sources, and Implications," Environmental Science & Technology, 2019, pp. 12247-12256.

Jian Chen et al., "Field Measurement of NO2 and RNO2 by Two-Channel Thermal Dissociation Cavity Ring Down Spectrometer," Chinese Journal of Chemical Physics, 2017, pp. 493-498, vol. 30.

Mark R. Stolzenburg et al., "Method for the Automated Measurement of Fine Particle Nitrate in the Atmosphere," Environmental Science & Technology, 2000, pp. 907-914, vol. 34.

Mustafa Z. Özel et al., "New Sensitive and Quantitative Analysis Method for Organic Nitrogen Compounds in Urban Aerosol Samples," Environmental Science & Technology, 2021, pp. 1497-1505.

Xu Yu et al., "Simultaneous Determination of Aerosol Inorganic and Organic Nitrogen by Thermal Evolution and Chemiluminescence Detection," Environmental Science & Technology, 2011, pp. 11579-11589.

Qianfeng Li et al., "Determination of Total Aerosol Nitrogen by Thermal Evolution," Aerosol Science and Technology, 2004, pp. 382-390.

Jinjian Li et al., "Online measurement of aerosol inorganic and organic nitrogen based on thermal evolution and chemiluminescent detection," Atmospheric Environment, 2022, pp. 1-10.

* cited by examiner

ATMOSPHERIC AEROSOL INORGANIC AND ORGANIC NITROGEN QUANTIFICATION METHOD AND SYSTEM

CROSS-REFERENCE OF RELATED APPLICATIONS

This present application claims the benefit of U.S. Provisional Patent Application No. 63/252,179 filed on Oct. 5, 2021, which is incorporated by reference herein in its entirety.

FIELD OF THE INVENTION

The present invention generally relates to environmental science fields. More specifically, the present invention relates to simultaneous quantification of inorganic and organic nitrogenous aerosols in atmosphere.

BACKGROUND OF THE INVENTION

As an important source of fixed nitrogen and a limiting nutrient in the biogeochemical cycling, nitrogenous aerosols, including inorganic nitrogen (IN) and organic nitrogen (ON), are crucial in controlling primary production in the biosphere (Elser et al., 2007; Gruber and Galloway, 2008). The major inorganic nitrogen species in atmosphere are ammonium ($NH_4^+$) and nitrate ($NO_3^-$). Organic nitrogen includes a wide variety of nitrogen-containing organics in a reduced form, such as urea, amino acid, alkyl amines, and N-heterocyclic compounds, or in an oxidized form, like organic nitrates and nitro-aromatic compounds.

However, excess nitrogen is a serious threat to the ecosystem and biodiversity by causing soil acidification, aquatic eutrophication, and stratospheric ozone depletion (Fenn et al., 1998; Gruber and Galloway, 2008). This is also why the environmental impacts of nitrogenous aerosols have attracted wide attention.

Given such importance, quantitative understanding of the ambient abundance and chemical characteristics of atmospheric nitrogenous aerosols is required. While the quantification of aerosol inorganic nitrogen species has been well established and routinely conducted by ion chromatography (IC), accurate and precise determination of the bulk organic nitrogen remains a challenge. In principle, one approach to determine bulk organic nitrogen concentration is to estimate by subtracting the inorganic nitrogen concentration from the total nitrogen concentration, where inorganic nitrogen is the sum of nitrate-nitrogen ($NO_3^-$—N) and ammonium-nitrogen ($NH_4^+$—N) concentration measured by IC analysis. In practice, the quantification of total nitrogen is executed by using a total nitrogen analyzer to analyze water extraction of aerosol sample. In such a total nitrogen analyzer, all the nitrogen-containing components in the water extract are converted to measurable inorganic forms. By this approach, the total nitrogen value stands for the water-soluble part of the sample. Therefore, the bulk organic nitrogen concentration determined by the above method is the water-soluble organic nitrogen (WSON) concentration. There is a lack of analyzing the water-insoluble part of organic nitrogen.

This difference method has two major uncertainties: (1) WSON concentration is a derivative value (Cornell et al., 2003; Russell et al., 2003); and (2) the sampling losses and possible incomplete conversion of organic nitrogen to inorganic components result in bias for WSON quantification (Bronk et al., 2000; Mace and Duce, 2002). And these limitations often lead to a negative value of obtained WSON concentration, which has been reported in many studies covering various geographical locations such as China (Yu et al., 2020), Atlantic Ocean (Lesworth et al., 2010) and the eastern Mediterranean (Tsagkaraki et al., 2021).

A few studies determined aerosol water-insoluble organic nitrogen (WION) based on the difference between total nitrogen measured by an elemental analyzer and water-soluble total nitrogen (WSTN) measured by a total nitrogen analyzer (Miyazaki et al., 2011; Pavuluri et al., 2015). However, this method has comparatively large uncertainties in WION quantification (16%) due to the propagated errors (Miyazaki et al., 2011). Due to a lack of a direct method to analyze WION, the majority of current aerosol organic nitrogen studies focus on the WSON fraction despite the contribution of WION to bulk organic nitrogen can be also significant (Bhattarai et al., 2019).

Therefore, a reliable quantification of inorganic and organic nitrogenous aerosols without considering water solubility is desired in this field. The present invention addresses this need.

SUMMARY OF THE INVENTION

In accordance with a first aspect of the present invention, an atmosphere nitrogen quantification method is provided. First, ambient air is sampled by drawing it though an inlet to obtain an air sample. The air sample is further processed to reduce positive artifacts. After artifact removal, the air sample is filtered to collect an aerosol sample. A stepwise temperature program is conducted to thermally desorb the aerosol sample to obtain a gaseous product mixture. Using an oxygen-containing carrier gas, the gaseous product mixture is oxidized to generate oxidized gaseous products, which will be further processed to form an NO product. The NO product is reacted with ozone to produce an excited $NO_2^*$ molecule for causing a chemiluminescent reaction. The excited $NO_2^*$ molecule can emit fluorescence light for quantification. During the reaction, the emitting fluorescence is a detectable and quantifiable subject. With the help of a photomultiplier tube (PMT) or any other fluorescence quantification methods or devices, the intensity of the emitting fluorescence is evaluated. The intensity of fluorescence emitted during de-excitation process of the excited form $NO_2^*$ molecule is correlated with the amount of excited form $NO_2^*$ molecule. Therefore, by quantifying the intensity of fluorescence, the concentration of $NO_2^*$ molecules is measured. Since the quantified nitrogen molecule is from the sampled air, the resultant intensity represents the concentration of total nitrogen, including inorganic and organic nitrogen, in the atmospheric aerosols as a N signal.

In accordance with one embodiment of the present invention, the inlet has a 2.5 μm sharp-cut cyclone to allow aerosol particles of an aerodynamic diameter of 2.5 μm or smaller to pass through the analytical system and the ambient air is drawn at a flow rate of 8.0 L/min.

In accordance with one embodiment of the present invention, the positive artifacts are caused by adsorption of gas-phase compounds and reduced by a parallel-plate filter denuder.

In accordance with another embodiment of the present invention, the stepwise temperature program is a 6-step temperature program for thermal evolution.

In accordance with one embodiment of the present invention, the 6-step temperature program is a heating program with 6 progressive heating temperature degrees, wherein the 6 temperature degrees are 150° C., 180° C., 300° C., 400° C., 500° C. and 800° C. Notably, the steps of stepwise temperature program are variable. It can be more or less than 6 steps, as long as the temperature degree has stepwise changes.

In accordance with one embodiment of the present invention, the gaseous product mixture is oxidized to generate oxidized gaseous products under 840-870° C. in the presence of oxygen and $MnO_2$ catalyst.

In accordance with one embodiment of the present invention, the oxidized gaseous products comprise a $CO_2$ product and nitrogen oxides products (termed as $NO_y$).

In accordance with one embodiment of the present invention, the oxidized gaseous products are further split and subjected into two paths. Particularly, one path is directed to a carbon detector for transforming the $CO_2$ product into a $CH_4$ product and the other path is directed to a $NO_x$ analyzer comprising a NO convertor for transforming the nitrogen oxides products into the NO product.

In accordance with one embodiment of the present invention, the carbon detector is a Non-Dispersive Infra-Red (NDIR) detector that monitors $CO_2$ product and measure the carbon amount of the $CO_2$ product to generate the C signal, or the carbon detector is a flame ionization detector (FID) that converts the $CO_2$ product to a $CH_4$ product and measure the carbon amount of the $CH_4$ product to generate the C signal.

In accordance with one embodiment of the present invention, a C/N signal ratio is evaluated to verify if the N signal is whether dominated by inorganic nitrogen or organic nitrogen, since inorganic nitrogen species do not contain any carbon.

In accordance with one embodiment of the present invention, the C signal and N signal are processed resolve overlapping peaks by using a multivariate curve resolution (MCR) tool.

In accordance with one embodiment of the present invention, the NO convertor is a molybdenum convertor.

In accordance with one embodiment of the present invention, a flow-adjustable needle valve is deployed on the path to the $NO_x$ analyzer.

In accordance with one embodiment of the present invention, a calibration curve is constructed by a standard solution containing both carbon and nitrogen.

The evolved carbon (C) and nitrogen (N) products are monitored simultaneously. The joint monitoring of the $CO_2$ product and nitrogen oxides products is an important feature of the analyzer. This feature facilitates differentiate IN and ON as IN species only have N signal while ON materials produce both C and N signals. The N signal as a function of the temperature program produces a graph termed as a N thermogram. Similarly, the C signal as a function of the temperature program produces a graph termed as a C thermogram. In the aerosol N thermograms, while IN and ON signals exhibit distinct thermal characteristics, they are not distinctive peaks. A multivariate curve resolution (MCR) tool is used to solve the overlapping peaks. The MCR data treatment is implemented using Positive Matrix Factorization (PMF) model. Specifically, PMF is performed on a data matrix X (n×m), in which n is the number of samples, m is the number of C and N peaks in the thermograms, and a given entry Xi in the matrix is the peak intensity of C or N of a peak in the thermogram. The PMF model decomposes the data matrix X into two matrices: factor contributions and factor profiles. As a result, the IN and ON factors (i.e., subcomponents of IN and ON) are resolved relying on their distinct thermal profiles. The IN and ON quantities are then obtained by summing up the N masses in all IN and ON factors, respectively.

In accordance with a second aspect of the present invention, an online atmosphere nitrogen quantification system is provided. The system includes an inlet for intaking atmospheric air samples, a denuder for reducing positive artifacts of air samples and filtering the air sample to collect an aerosol material, a carbon analyzer having a front oven for thermally evolving the aerosol product to obtain a gaseous product mixture and a back oven for oxidizing the gaseous product mixture with an oxygen-containing carrier gas to generate oxidized gaseous products, a carbon detector for carbon measurement, a needle valve for flow adjustment, a NOx analyzer having a NO convertor, an ozonator for generating ozone, a reaction chamber for reacting a NO product with ozone, a fluorescence quantification module for evaluating and quantifying fluorescence intensity and correlating the fluorescence intensity to a concentration of $NO_2^*$ molecules.

In accordance with one embodiment of the present invention, the inlet has a cut cyclone and the ambient air is drawn at a flow rate of at least 8.0 L/min.

In accordance with one embodiment of the present invention, the denuder is a parallel plate filter denuder.

In accordance with one embodiment of the present invention, the front oven performs a stepwise temperature program In accordance with one embodiment of the present invention, the oxygen-containing carrier gas is $He/O_2$ In accordance with one embodiment of the present invention, the catalytic convertor is a molybdenum catalytic convertor In accordance with one embodiment of the present invention, the carbon detector is a nondispersive infrared detector or a flame ionization detector.

In accordance with one embodiment of the present invention, the system further comprises a data logging module for analyzing, calculating, and saving the fluorescence intensity data, a temperature control module for adjusting and controlling the stepwise temperature program of the front oven and the temperature of back oven, and a controller to control the data logging module and the temperature control module.

BRIEF DESCRIPTION OF THE DRAWINGS

Embodiments of the invention are described in more detail hereinafter with reference to the drawings, in which:

FIG. 2A depicts the thermograms of $NH_4NO_3$, $(NH_4)_2SO_4$ and $NH_4HSO_4$; FIG. 2B shows the nitrogen mass distribution of $NH_4NO_3$, $(NH_4)_2SO_4$ and $NH_4HSO_4$; FIG. 2C shows the thermogram and the stepwise nitrogen mass distributions of HULIS extracted from ambient $PM_{2.5}$ sample, representing the thermal evolution characteristics of water-soluble ON complex mixture; FIG. 2D depicts the thermogram of a whole ambient aerosol sample; and FIG. 2E shows the stepwise nitrogen mass distribution of a whole ambient aerosol sample;

FIG. 3A depicts 6-step temperature program (150, 180, 300, 400, 500 and 800° C., where the first two temperatures are repeated to circumvent the instrument limit on the longest residence time allowed (i.e., 400 s) while meeting the need to have a heated period longer than 400 s and signals from the repeat steps of the same temperature are combined in data analysis; FIG. 3B is the thermogram of a single standard of $NH_4NO3$; FIG. 3C shows the N mass distribution of $NH_4NO_3$ at each temperature step; FIG. 3D exhibits the thermograms of single standards of $(NH_4)_2SO_4$ and $NH_4HSO_4$; FIG. 3E shows the N mass distributions of $(NH_4)_2SO_4$ and $NH_4HSO_4$ at each temperature step; FIG. 3F is the thermogram of an aerosol WSON complex mixture (HULIS); FIG. 3G shows the N mass distribution of a HULIS sample at each temperature step; FIG. 3H is the thermogram of an aerosol WION complex mixture; FIG. 3I depicts the N mass distribution of a WION sample at each temperature step. FIG. 3J is the thermogram of a whole ambient aerosol sample; and FIG. 3K shows the N mass distribution of an ambient sample at each temperature step;

FIG. 8A depicts aerosol ON versus $NO_x$; FIG. 8B depicts aerosol ON versus IN; FIG. 8C exhibits aerosol ON versus $NH_4^+$—N; and FIG. 8D shows aerosol ON versus $NO_3^-$—N; FIG. 9A depicts the comparison between the present online method and the offline IC analysis of quartz filter; FIG. 9B depicts the comparison between the present online method and the offline IC analysis of Teflon filter; and FIG. 9C shows the correlations between the offline IC analysis of quartz filter and Teflon filter.

DETAILED DESCRIPTION

Figure 1:
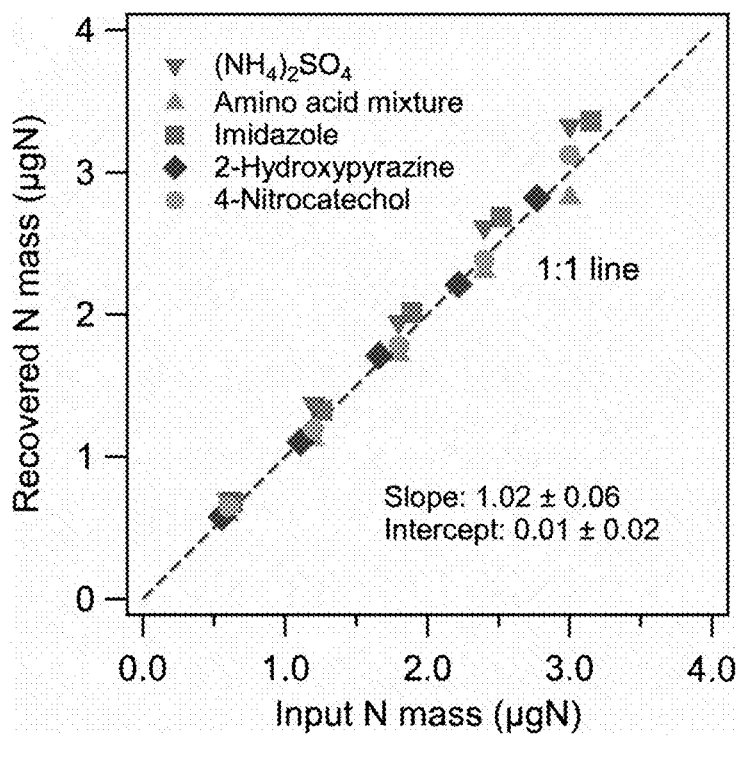
FIG. 1 depicts nitrogen recovery test results of different inorganic and organic nitrogen standards.

In the following description, a method of both offline laboratory and online atmospheric inorganic and organic nitrogen quantification and a system thereof are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance with a first aspect of the present invention, the present invention provides a method of atmospheric bulk inorganic and organic nitrogen quantification. The online atmospheric nitrogen quantification method integrates an online aerosol carbon analyzer based on thermal evolution method (RT-3131, Sunset Laboratory, USA) and a chemiluminescent $NO_x$ analyzer (Model 42i, Thermo Scientific, USA). For evaluating aerosol inorganic and organic nitrogen in atmosphere, the ambient air is sampled. During the sampling period, the ambient air is drawn through an inlet with a 2.5 μm cut cyclone at a flow rate of 8.0 L/min. A parallel-plate filter denuder (Sunset Laboratory, USA) is installed to reduce the positive artifacts from the gas-phase compound adsorption to the quartz fiber filter. In the front oven of the carbon analyzer, ambient $PM_{2.5}$ is collected on a 1.23 $cm^2$ circular quartz filter pre-baked during the previous analysis cycle. During the analysis, aerosols collected on the filter are thermally evolved under the stepwise temperature program, and then enter the back oven with the $He/O_2$ carrier gas. In the back oven, the gaseous products are oxidized to $CO_2$ and nitrogen oxides ($NO_y$) under 840° C. in the presence of oxygen and $MnO_2$ catalyst. Then, the flow is split into two paths, one to an NDIR detector to monitor C signal and the other to a $NO_x$ analyzer. The $NO_y$ products enter the $NO_x$ analyzer and are transformed into NO by the molybdenum (Mo) catalytic convertor. In the reaction chamber, the ozonator generates ozone to react with NO and produces excited $NO_2$* molecules. The fluorescence light emitted during this chemiluminescent reaction is detected by a photomultiplier tube for quantification of nitrogenous species. Calibration curve is constructed by spiking standard solutions containing C and N onto the prebaked filter. Thus, total nitrogen mass concentrations of the analyzed aerosol sample can be quantified directly.

The evolved carbon (C) and nitrogen (N) products are monitored simultaneously. The joint monitoring of the $CO_2$ product and nitrogen oxides products is an important feature of the analyzer. This feature facilitates differentiate IN and ON as IN species only have N signal while ON materials produce both C and N signals. The N signal as a function of the temperature program produces a graph termed as a N thermogram. Similarly, the C signal as a function of the temperature program produces a graph termed as a C thermogram. In the aerosol N thermograms, while IN and ON signals exhibit distinct thermal characteristics, they are not distinctive peaks. A multivariate curve resolution (MCR) tool is used to solve the overlapping peaks. The MCR data treatment is implemented using Positive Matrix Factorization (PMF) model. Specifically, PMF is performed on a data matrix X (n×m), in which n is the number of samples, m is the number of C and N peaks in the thermograms, and a given entry Xi in the matrix is the peak intensity of C or N of a peak in the thermogram. The PMF model decomposes the data matrix X into two matrices: factor contributions and factor profiles. As a result, the IN and ON factors (i.e., subcomponents of IN and ON) are resolved relying on their distinct thermal profiles. The IN and ON quantities are then obtained by summing up the N masses in all IN and ON factors, respectively.

In another embodiment of the present invention, it can be used as a laboratory equipment for evaluating the sample taken from several places. For such, an offline atmospheric aerosol inorganic and organic nitrogen quantification system is provided. The offline system shares the same analytical principle with the online one except for the sample introduction part. The offline system is used in laboratory to analyze pre-collected aerosol samples on filter substrates. It does not have an inlet system for aerosol sampling. Comparatively, the online nitrogen measurement system is capable of producing high-time resolution data in field campaigns, while the offline system has the advantage of analyzing aerosol samples collected at multiple sites with ease. For nitrogen quantification with the offline system, a filter aliquot is placed in the front oven of the analyzer. During the analysis, the temperature of the front oven is programmed to allow controlled thermal evolution of the aerosol materials into the $He/O_2$ carrier gas flow. Gaseous products evolved from the front oven are then passed to the back oven, which is packed with a $MnO_2$ catalyst and held at a preset and programmable temperature (840-870° C.), are oxidized to $CO_2$ and $NO_y$. Flow from the back oven is split into two paths, one to a methanator then a flame ionization detector (FID) to measure the carbon amount after converting $CO_2$ to $CH_4$, and the other to the molybdenum (Mo) catalytic convertor where $NO_y$ is converted to NO. NO then reacts with ozone to produce excited $NO_2*$, emitting fluorescence light for quantification. After obtaining C and N thermograms, data treatment process for IN and ON quantification is the same as the description above.

In accordance with one embodiment of the present invention, the stepwise temperature program is a 6-step temperature program for thermal evolution. Preferably, the 6-step temperature program applies 150° C., 180° C., 300° C., 400° C., 500° C., and 800° C. The carbon signal is monitored by an NDIR detector or a FID which is a part of aerosol carbon analyzer. The nitrogen signals obtained by the chemiluminescent detection are recorded by a data logger at a resolution of 10 Hz (other resolutions such as 100 Hz, 2 Hz, 1 Hz are also suitable, depending on the needs of data processing). The distinct thermal evolution behaviors of inorganic nitrogen and organic nitrogen constituents in ambient samples facilitate the separation of the two nitrogenous aerosols. However, accurate resolution (quantification) of IN and ON relies on MCR data treatment of concurrently measured carbon and nitrogen thermograms showing above. Details of the residence time and evolved nitrogen signal at each heating stage are listed in Table 1.

TABLE 1

Summary of the major nitrogen signals at each
temperature step resolved by the multivariate
curve resolution analysis for ambient samples

| Step | Temperature (° C.) | Time (s) | Characteristics of the evolved nitrogen signal |
|---|---|---|---|
| 1 | 150 | 500 | Dominated by IN: $NH_4NO_3$ (major), $(NH_4)_2SO_4$ (minor) |
| 2 | 180 | 500 | Dominated by IN: $(NH_4)_2SO_4$ (major) |
| 3 | 300 | 420 | Dominated by IN: $NH_4HSO_4$ (major), $(NH_4)_2SO_4$ (minor) |
| 4 | 400 | 420 | Both IN and ON |
| 5 | 500 | 480 | Both IN and ON: ON contributes a larger fraction |
| 6 | 800 | 490 | ON |

In accordance with one embodiment of the present invention, the method is tested in different standard samples for building calibration curves.

The calibration curve is constructed by spiking nitrogen standard solutions onto the prebaked filter. The mass concentration of total nitrogen aerosols is quantified based on the calibration curve constructed using single nitrogen standards at five concentration levels in the range of 0.6-3.2 μgN.

A series of inorganic and organic nitrogenous aerosol standards are selected to verify quantitative determination of nitrogen and to investigate characteristics of the nitrogen thermograms. Major inorganic nitrogen species in the ambient atmosphere, including $(NH_4)_2SO_4$, $NH_4HSO_4$, and $NH_4NO_3$, are analyzed. Additionally, organic nitrogen standards with different functional groups are further tested, including three oxidized organic nitrogen compounds (i.e., nitrophenol, 4-nitrocatechol, and nitroguaiacol), two reduced organic nitrogen species (i.e., imidazole and 2-hydroxypyrazine), and a mixture of five single amino acid standards (i.e., alanine, arginine, glycine, histidine, and serine).

As shown in FIG. 1, the nitrogen standards including an inorganic nitrogen standard $(NH_4)_2SO_4$, an oxidized organic nitrogen standard 4-nitrocatechol, two single reduced organic nitrogen standards: imidazole and 2-hydroxypyrazine and a reduced organic nitrogen mixture standard of amino acid are tested to verify the stability of the presented invention. The response for different inorganic nitrogen and organic nitrogen standards shows excellent consistency. The linear regression yields a nitrogen recovery curve with a slope of 1.02±0.06, and an intercept of 0.01±0.02. For each individual standard tests, the regression exhibits $R^2>0.99$. This indicates that nitrogen in nitrogenous aerosols with different chemical structures or functional groups can be completely converted to $NO_y$ products and be measured by the present invention.

In accordance with one embodiment of the present invention, atmospheric organic nitrogen samples and inorganic nitrogen samples are assessed by the present invention.

Humic-like substances (HULIS) is the hydrophobic fraction of water-soluble organic components in the ambient aerosol. As a mixture of thousands of organic constituents, HULIS extracted from ambient $PM_{2.5}$ samples retains the compositional complexity of atmospheric aerosols. The thermogram of HULIS samples can reflect the thermal evolution characteristics of the environmental organic nitrogen mixture.

Figure 2A:
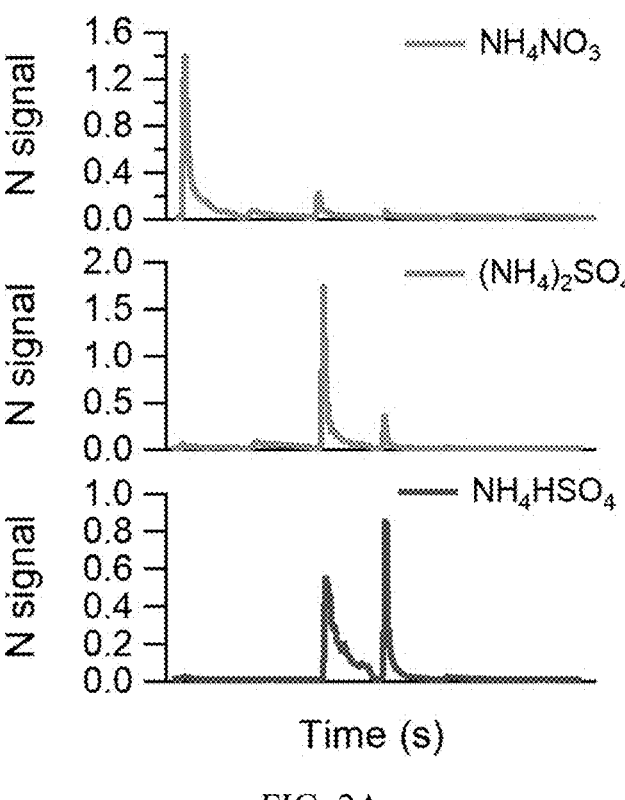
FIGS. 2A-2E depict typical nitrogen thermograms under the 6-step temperature program and the corresponding nitrogen masses of nitrogen standards and ambient samples.
Figure 2B:
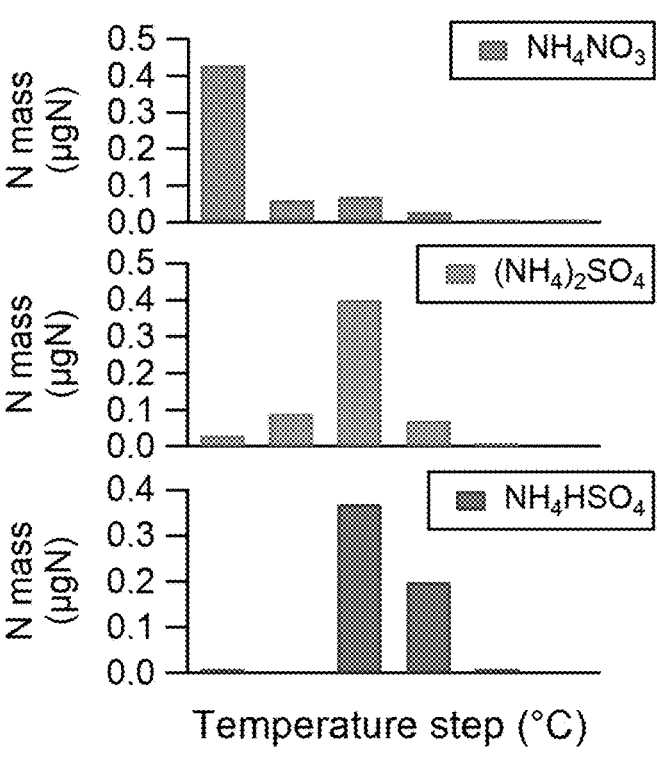

FIGS. 2A-2E show the typical nitrogen thermograms under the 6-step temperature program and the corresponding nitrogen masses of the nitrogen standards and ambient samples. According to the thermograms, different nitrogen-containing components exhibit distinct thermal evolution behaviors. Referring to FIGS. 2A-2B, $NH_4NO_3$ evolves mainly at the first temperature step (150° C.), with minor nitrogen factions coming out in later stages; $(NH_4)_2SO_4$ has nitrogen peaks at 180° C., 300° C., and 400° C.; and $NH_4HSO_4$ evolves relatively later than $(NH_4)_2SO_4$, starting from 300° C., and produces a significant nitrogen fraction at 400° C. compared with the other two inorganic nitrogen species.

Figure 2C:
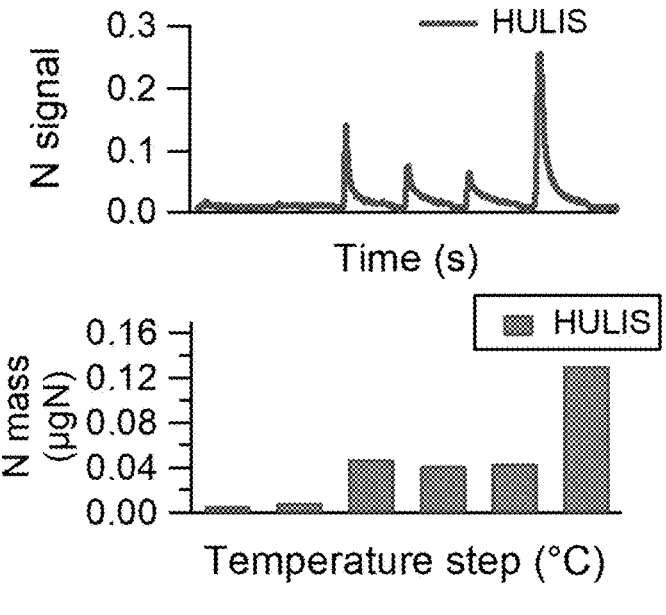
Figure 2D:
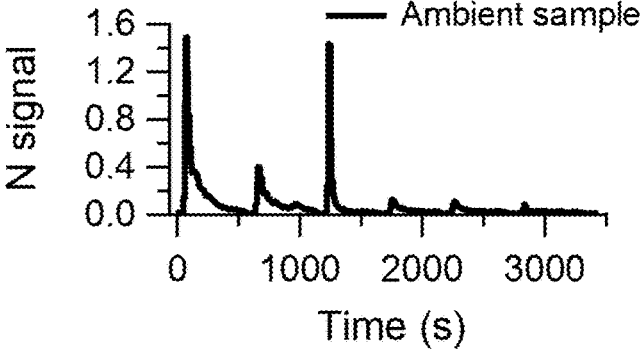
Figure 2E:
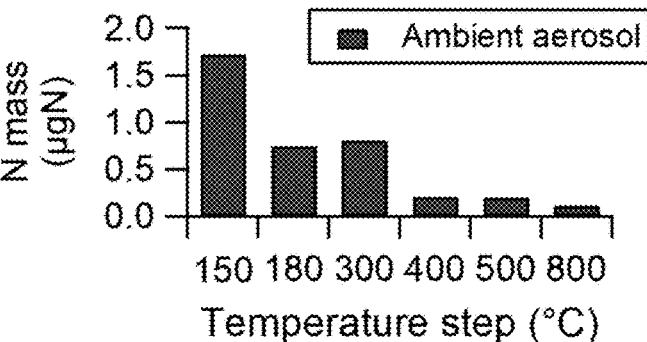

Referring to FIG. 2C, the atmospheric organic nitrogen complex mixture, HULIS, has N signals throughout all the 6 temperature steps, with very minor contributions from N at the lower temperatures (150 and 180° C.) and a significant N peak at 800° C. This reflects the less volatile nature of aerosol ON mixtures compared with major IN species. FIGS. 2D-2E depict the thermogram and the stepwise nitrogen mass distributions of a whole ambient aerosol sample. As expected, the N thermogram of the whole ambient aerosol sample has peaks at all temperature stages, reflecting combined features of both inorganic and organic nitrogen fractions.

9

Figures 3A, 3B, 3C, 3D, 3E, 3F, 3G, 3H, 3I, 3J, 3K:
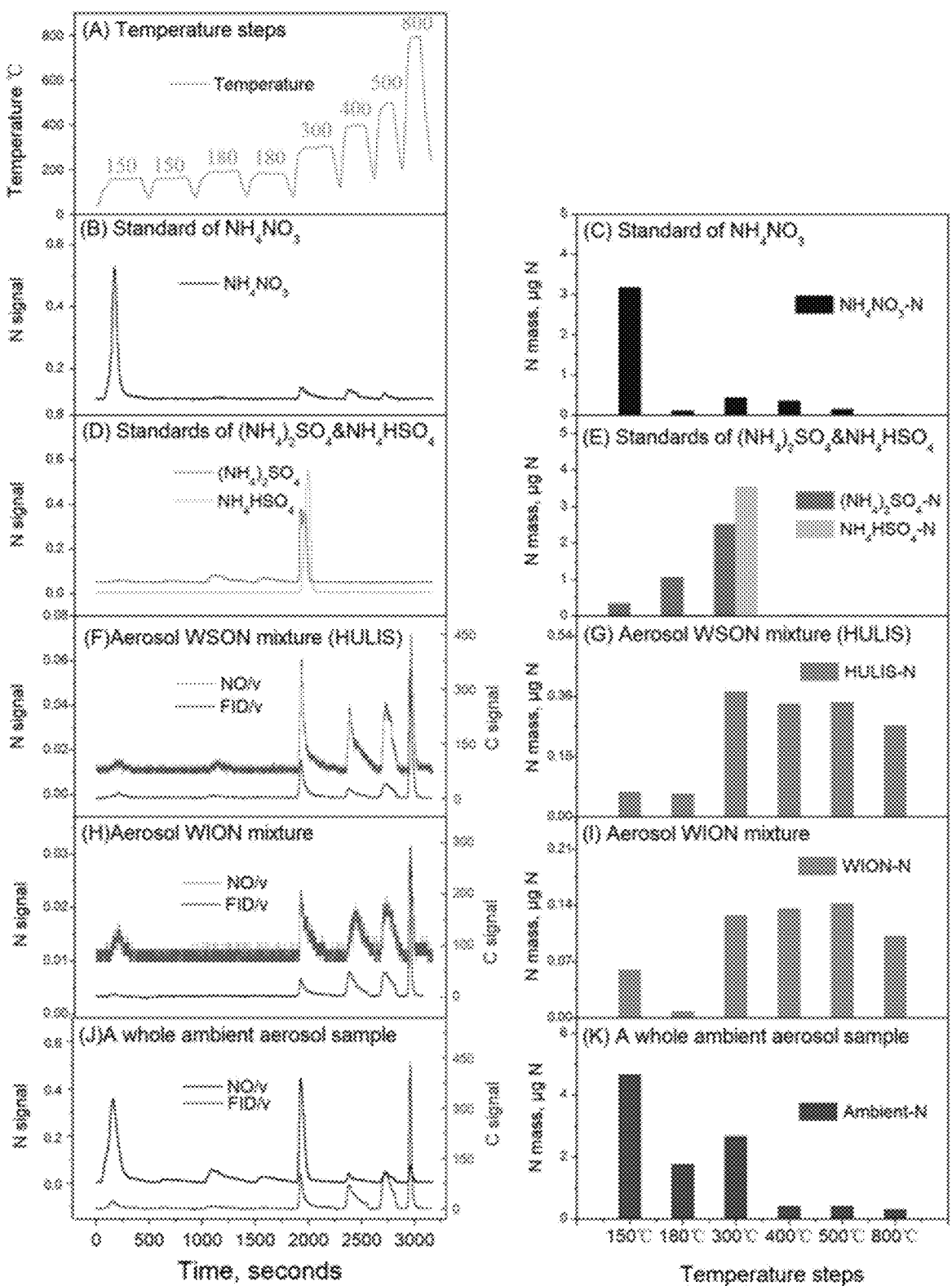
FIGS. 3A-3K shows example C and N thermograms under a 6-step temperature program and corresponding distributions of N masses at each temperature step.

Referring to FIGS. 3A-3K, example thermograms of individual IN standards (i.e., $NH_4NO_3$, $(NH_4)_2SO_4$, and $NH_4HSO_4$), aerosol WSON and WION mixtures and an ambient PM2.5 sample under a 6-step temperature program (150, 180, 300, 400, 500, and 800° C.) (FIG. 3A). Thermal program characteristics of identification utility are described below: (1) $NH_4NO_3$ produces a major function of N signal at 150° C. and a minor fraction at higher temperature steps (FIG. 3B-3C); (2) $(NH_4)_2SO_4$ evolves mostly at the 180 and 300° C. steps, consistent with a previous mechanistic study reporting its decomposition and releasing $NH_3$ at 170° C. to form $(NH_4)_3H(SO_4)_2$; (3) $NH_4HSO_4$ produces nearly all N signals at 300° C. steps (FIG. 3D-3E); and (4) aerosol ON mixtures, including both WSON and WION, produce N signals at all temperature steps, but most of their N signals are evolved at the temperature steps of ≥300° C. (FIG. 3F-3I). The minor fractions of WSON and WION appearing at the lowest two temperature steps of 150 and 180° C. are likely associated with the more volatile forms of ON or those nitrogenous materials that are susceptible to facile thermal decomposition. The C thermograms corroborate the organic nature of the WSON and WION mixtures (FIG. 3F and 3H). Note that the thermograms of WSON and WION do not reveal distinguishable features between the two, suggesting that structure moieties underlying water solubility do not drive the thermal evolution behaviors of the ON molecules. The C and N thermograms for the example whole aerosol sample are shown in FIG. 3J, which displays distinctive differences. Specifically, at the lowest two temperature steps (150 and 180° C.), there are significant N peaks but with very little associated C. This reflects that $NH_4NO_3$, which evolves at 150° C., and $(NH_4)_2SO_4$, part of which evolves at 180° C., are large contributors of aerosol N while only a very minor fraction of organic aerosol materials evolves at these two temperatures. As shown in FIG. 3J, it is noted that over half of the aerosol C contents evolves at the last three temperature steps (400, 500, and 800° C.). These results qualitatively suggest that N signals at 150 and 180° C. steps are mostly ascribed to the evolution of aerosol IN, while aerosol organics evolve dominantly at temperatures higher than 180° C.

The C/N ratios of the evolved aerosol materials corresponding to the individual temperature steps for 60 ambient $PM_{2.5}$ samples analyzed in the embodiments. Note that the carrier gas used here contains oxygen (1% $O_2$/99% HE) throughout the analysis, which substantially reduces organic carbon pyrolyzation. Table 2 shows that the average C/N ratios for the set of 60 samples at 150 and 180° C. steps are 0.37 and 0.63, respectively, significantly lower than those (6.7-21.7) at the last three higher-temperature steps. As organic nitrogen aerosols contain a C signal while inorganic nitrogen does not contain a C signal, the largely varied C/N ratios at each temperature step qualitatively indicate whether the N signal involved at a given temperature is dominated by IN or likely also contains notable ON. Specifically, the C/N ratio information indicates that the N signals at the lowest two temperatures are largely attributed to IN, while the N signals at temperature steps of ≥300° C. ON are predominantly associated with ON.

TABLE 2

Mean C/N mass ratios in the evolved aerosol materials at individual temperature steps obtained with 60 ambient samples

| step | Temp (° C.) | C/N | Remark |
|---|---|---|---|
| T1 | 150 | 0.37 | mainly IN: $NH_4NO_3$, $NH_4Cl$ |

10

TABLE 2-continued

Mean C/N mass ratios in the evolved aerosol materials at individual temperature steps obtained with 60 ambient samples

| step | Temp (° C.) | C/N | Remark |
|---|---|---|---|
| T2 | 180 | 0.63 | mainly IN: $NH_4NO_3$, $(NH_4)_2SO_4$ |
| T3 | 300 | 1.23 | $NH_4HSO_4$, $(NH_4)_2SO_4$, and ON |
| T4 | 400 | 6.18 | ON |
| T5 | 500 | 12.17 | ON |
| T6 | 800 | 21.66 | Mainly ON and $KNO_3$, $NaNO_3$ |

Figure 5:
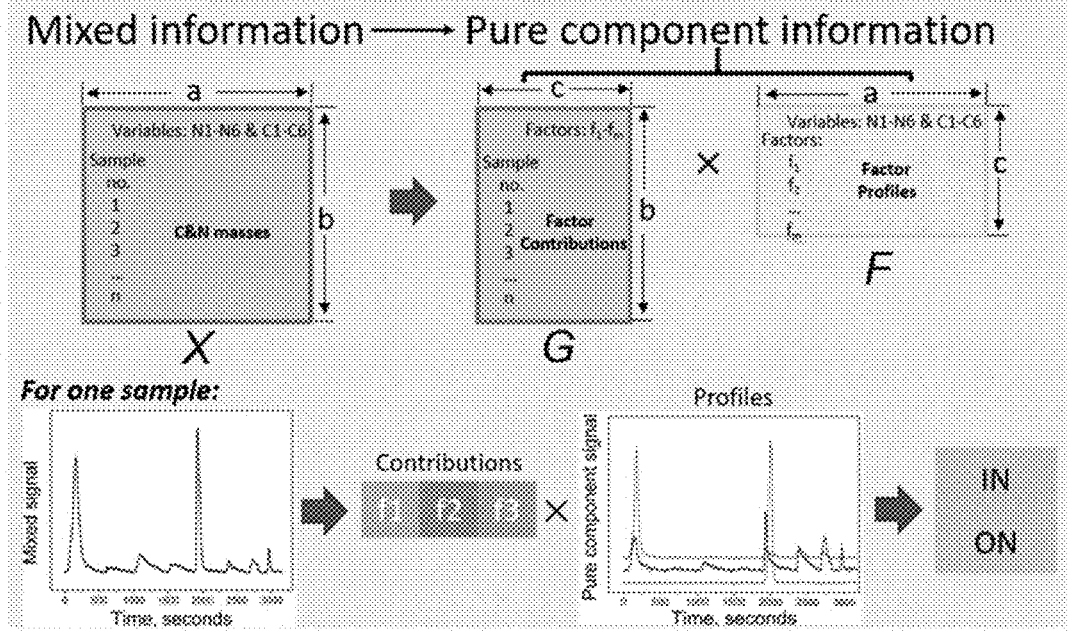
FIG. 5 shows the conceptual illustration of unraveling the mixed thermally evolved IN and ON signals to pure IN and ON components by a multivariate curve resolution tool; m is a matrix of sample data with mixed IN and ON signals, C and P represent the factor contribution matrix and factor profile matrix, respectively, showing the information of resolved IN and ON components, a, b, and c indicate the size of the matrixes.

For quantification of IN and ON by thermograms, multivariate curve resolution (MCR) technique is used. In the aerosol C and N thermograms, while IN and ON signals exhibit distinct thermal characteristics, they are not distinctive peaks. The target of resolving the IN and ON signals is, in principle, similar to the analytical situation of separating overlapping chromatographic peaks with spectroscopic detection resulting from a mixture. A MCR tool has been widely used to solve the overlapping peaks for multicomponent mixture samples. Therefore, MCR technique is applied to resolve signals for IN and ON from their overlapping thermograms. The principle is illustrated in FIG. 5. Specifically, the aerosol IN and ON analyzer generates a data matrix X (n×m), where n is the number of samples and m is the number of measurands (i.e., thermogram peak intensities). The MCR model decomposes the data matrix X into two matrices: factor contributions (C) and factor profiles (P). Mathematically, it can be presented as formula (I):

$$x_{ij} = \sum_{k=1}^{p} c_{ik} p_{kj} + e_{ij}$$

Where $x_{ij}$ is the measured amount (e.g., concentration) of jth species in the ith sample, $c_{ik}$ is the contribution of the kth factor to the ith sample, and $p_{kj}$ is the factor loading of jth species in the kth factor. is the residual amount for each data point. It is clear from the above formula (I) that the underlying principle of MCR is the chemical mass balance. Additionally, a non-negative constrain should be imposed in the application of MCR as a negative factor profile or contribution is physically meaningless for abundance quantities of chemical species. It is noted that positive matrix factorization (PMF), a variant of factor analysis technique widely used to resolve major pollution sources and quantify their contributions, shares the same principle with MCR analysis and has the non-negative constrain incorporated in the model. Thus, the mathematical implementation of the MCR analysis is carried out using USEPA PMF version 5.0. The performance of PMF analysis on predicting TN, IN, and ON masses is tested with laboratory-generated IN+ON mixtures as well as ambient aerosol samples and described in the next subsection. Qualitatively, the thermograms of different N species show distinct variation features, e.g., period of close to zero signal interspersed between discrete peaks in the thermograms, which are desirable for reducing rotational ambiguity in solutions resolved by the multivariate modeling. In other words, the peak areas in the N thermograms and the C thermograms are used as inputs for multivariate curve resolution data treatment to resolve inorganic and organic nitrogen quantities.

Figure 4:
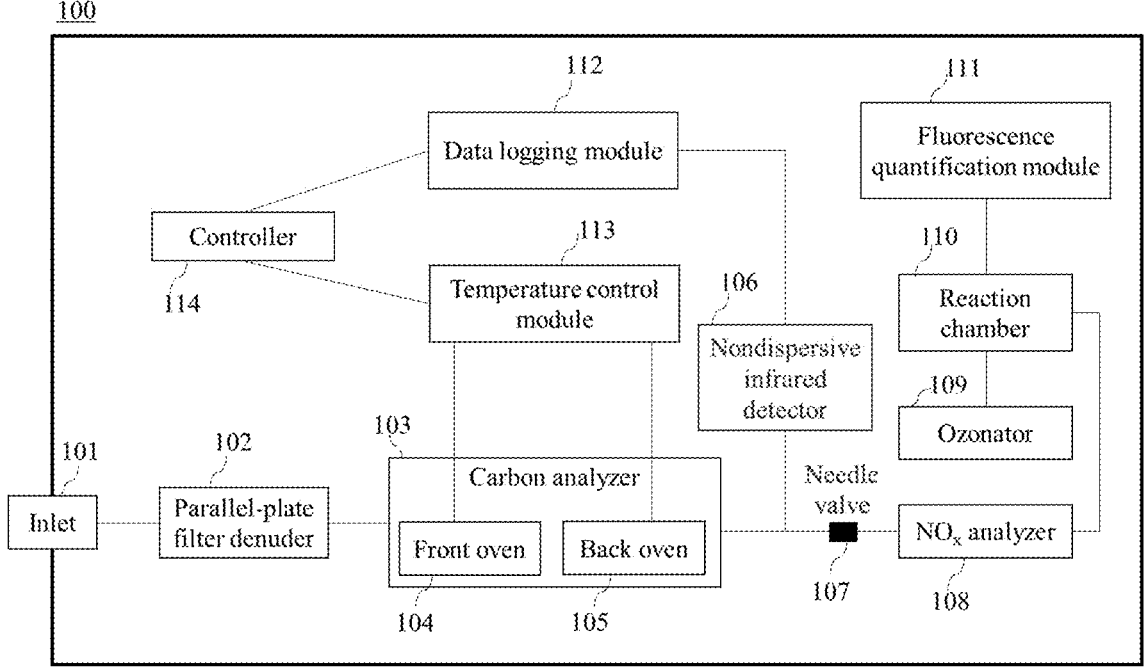
FIG. 4 depicts a schematic diagram of an online atmospheric inorganic and organic nitrogen quantification system.

FIG. 4 shows an online atmospheric nitrogen quantification system 100. Because the system delivers results as samples are collected, results can be posted online for publication of conditions in a particular area. System 100 includes an inlet 101. In one embodiment, inlet 101 may a sharp-cut cyclone with an aerodynamic cut-off diameter of 2.5 μm and ambient air can be drawn through the inlet at a rate of 8.0 L/min for sampling ambient air. The sampled air passes through a parallel-plate filter denuder 102 for reducing positive artifacts caused by adsorption of gas-phase compounds and then into a carbon analyzer 103 having a front oven 104 for carrying out a stepwise temperature program and thermally evolving the aerosol sample collected onto the quartz filter and a back oven 105 for oxidizing the gaseous product with an oxygen-containing carrier gas, such as a $He/O_2$ carrier gas.

After the carbon analyzer 103, the gas is split into two paths. One enters the NDIR detector 106 for carbon amount quantification. The other passes through a flow-adjustable needle valve 107 and enters a $NO_x$ analyzer 108 having a molybdenum catalytic convertor where it is transformed into NO. The transformed gas reacts with ozone, which is generated by an ozonator 109, and produces excited $NO_2$* molecules in a reaction chamber 110. A fluorescence quantification module 111 utilizes a photomultiplier tube to evaluate and quantify the intensity of fluorescence emitted during the chemiluminescent reaction. A data logging module 112 analyzes, calculates and saves the fluorescence intensity data. The intensity value of the fluorescence represents a total nitrogen mass concentration of the ambient air. Since this intensity value is generated in real time, the results are posted online for real time updates of environmental conditions.

The apparatus additionally includes a temperature control module 113 for adjusting and controlling the stepwise temperature program of the front oven 104 and the temperature of the back oven 105, and a controller 114 to control the data logging module 112 and the temperature control module 113. In one embodiment, the front oven has a pre-baked filter to filter the gas sample to obtain an aerosol product for further thermally evolving.

EXAMPLES

Example 1

The present invention is used to evaluate ambient inorganic and organic nitrogen aerosols. The testing sampling is conducted at the Hong Kong University of Science and Technology (HKUST) site. The statistical summary of the ambient sample is listed in Table 3.

TABLE 3

Statistical summary (average ± standard deviation) of meteorological parameters, air quality data, and aerosol nitrogen mass concentrations at the HKUST site during the measurement period (29 Nov. 2020-1 May 2021).

| | Subperiod | | |
| --- | --- | --- | --- |
| | Overall | Winter | Spring |
| | | Date | |
| | 29 Nov. 2020-1 May 2021 | 29 Nov. 2020-28 Feb. 2021 | 1 Mar. 2021-1 May 2021 |
| Dominant WD | — | North | Southeast |
| RH (%) | 74.1 ± 17.5 | 69.3 ± 17.4 | 85.4 ± 11.3 |
| T (° C.) | 18.3 ± 4.2 | 16.9 ± 3.8 | 21.7 ± 2.7 |
| WS (m/s) | 3.0 ± 1.7 | 3.1 ± 1.8 | 2.7 ± 1.3 |
| $O_3$ (ppb) | 45.4 ± 17.7 | 44.9 ± 16.4 | 47.0 ± 21.1 |
| $SO_2$ (ppb) | 1.0 ± 0.7 | 1.0 ± 0.8 | 1.2 ± 0.6 |

TABLE 3-continued

Statistical summary (average ± standard deviation) of meteorological parameters, air quality data, and aerosol nitrogen mass concentrations at the HKUST site during the measurement period (29 Nov. 2020-1 May 2021).

| | Subperiod | | |
| --- | --- | --- | --- |
| | Overall | Winter | Spring |
| | | Date | |
| | 29 Nov. 2020-1 May 2021 | 29 Nov. 2020-28 Feb. 2021 | 1 Mar. 2021-1 May 2021 |
| CO (ppb)$^a$ | 605 ± 186 | 686 ± 133 | 415 ± 152 |
| $NO_x$ (ppb) | 7.9 ± 6.8 | 7.8 ± 6.8 | 8.1 ± 6.9 |
| $PM_{2.5}$ (μg/m³)$^a$ | 16.7 ± 7.8 | 17.4 ± 7.8 | 15.0 ± 7.5 |
| TN (μgN/m³) | 1.84 ± 0.99 | 2.01 ± 1.04 | 1.41 ± 0.65 |
| ON (μgN/m³) | 0.24 ± 0.09 | 0.26 ± 0.09 | 0.22 ± 0.08 |
| IN (μgN/m³) | 1.59 ± 0.93 | 1.76 ± 0.99 | 1.19 ± 0.60 |

The measurement period spanned two seasons. In the winter subperiod (November-February), the prevailing winds were northerly and northeasterly while in the spring (March-May) subperiod, the southeast wind dominated. The $PM_{2.5}$ concentration level is lower in spring than that in winter (15.0 vs. 17.4 μg/m³).

Figure 6:
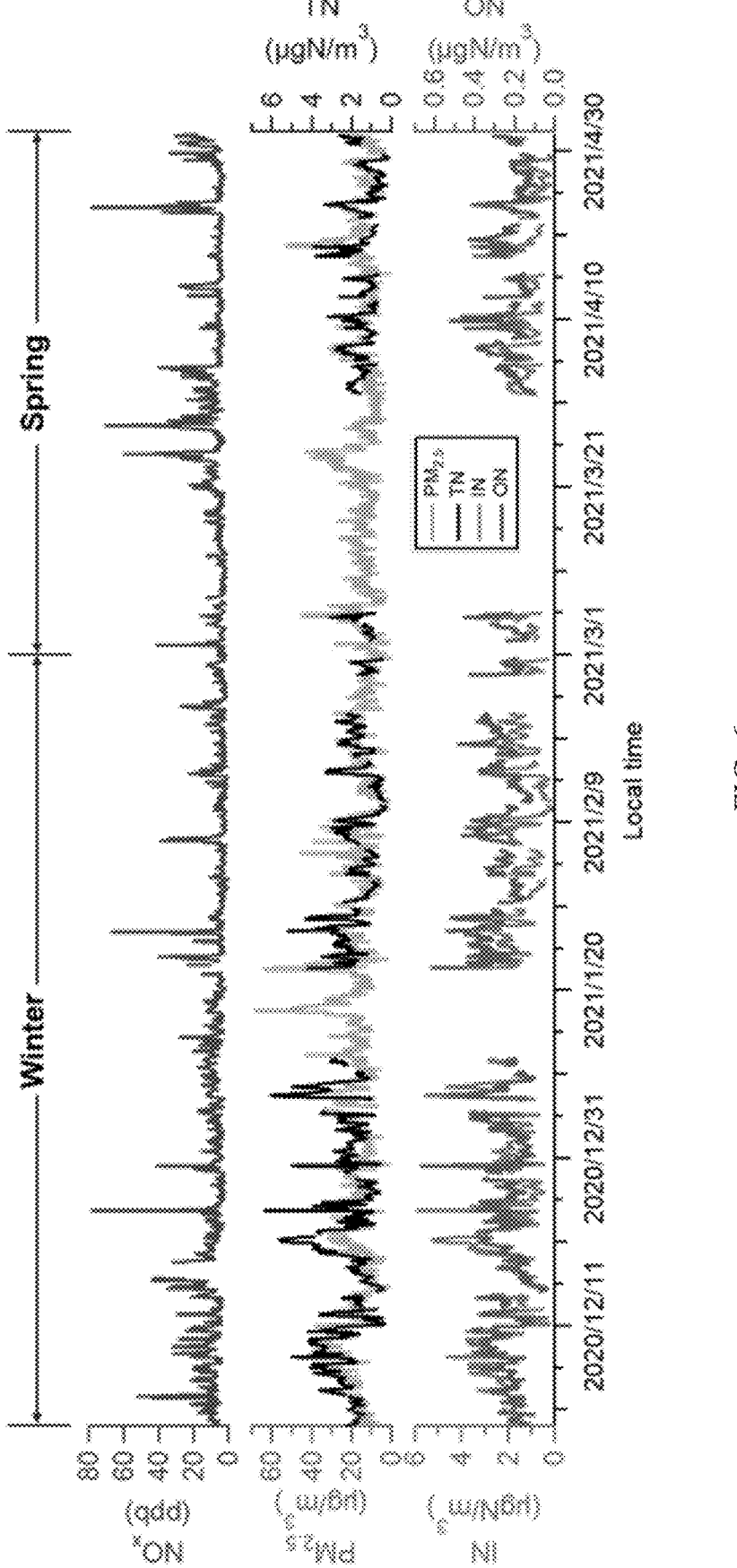
FIG. 6 shows time series of $NO_x$, $PM_{2.5}$, TN, IN, and ON concentrations at the Hong Kong University of Science and Technology (HKUST) site during the measurement period (29 Nov. 2020-1 May 2021)

The online aerosol nitrogen quantification method quantifies the atmospheric abundances of aerosol total nitrogen, inorganic nitrogen and organic nitrogen. FIG. 6 shows the time series of the nitrogenous aerosol concentrations, along with the $NO_x$ and $PM_{2.5}$ concentrations. During the measurement period, hourly aerosol total nitrogen (TN) is in a range of 0.18-6.33 μgN/m³ with an average of 1.84±0.99 μgN/m³. Inorganic nitrogen (IN) concentration is 0.07-5.89 μgN/m³ with an average of 1.59±0.93 μgN/m³. The concentration of organic nitrogen (ON) is 0.04-0.67 μgN/m³ with an average of 0.24±0.09 μgN/m³. Both inorganic nitrogen and organic nitrogen show lower concentrations in spring compared with those in winter (IN: −32.4%; ON: −15.4%). This is mainly associated with seasonal variations in strength of different nitrogen sources, weather conditions, and background concentrations which are largely influenced by regional transport of air pollutants. Overall, ON accounted for 13.0% of TN, indicating the significant presence of ON species in ambient nitrogenous aerosols. The ON fraction in TN is elevated in spring (15.6%) compared with winter (12.9%).

Example 2

Figure 7A:
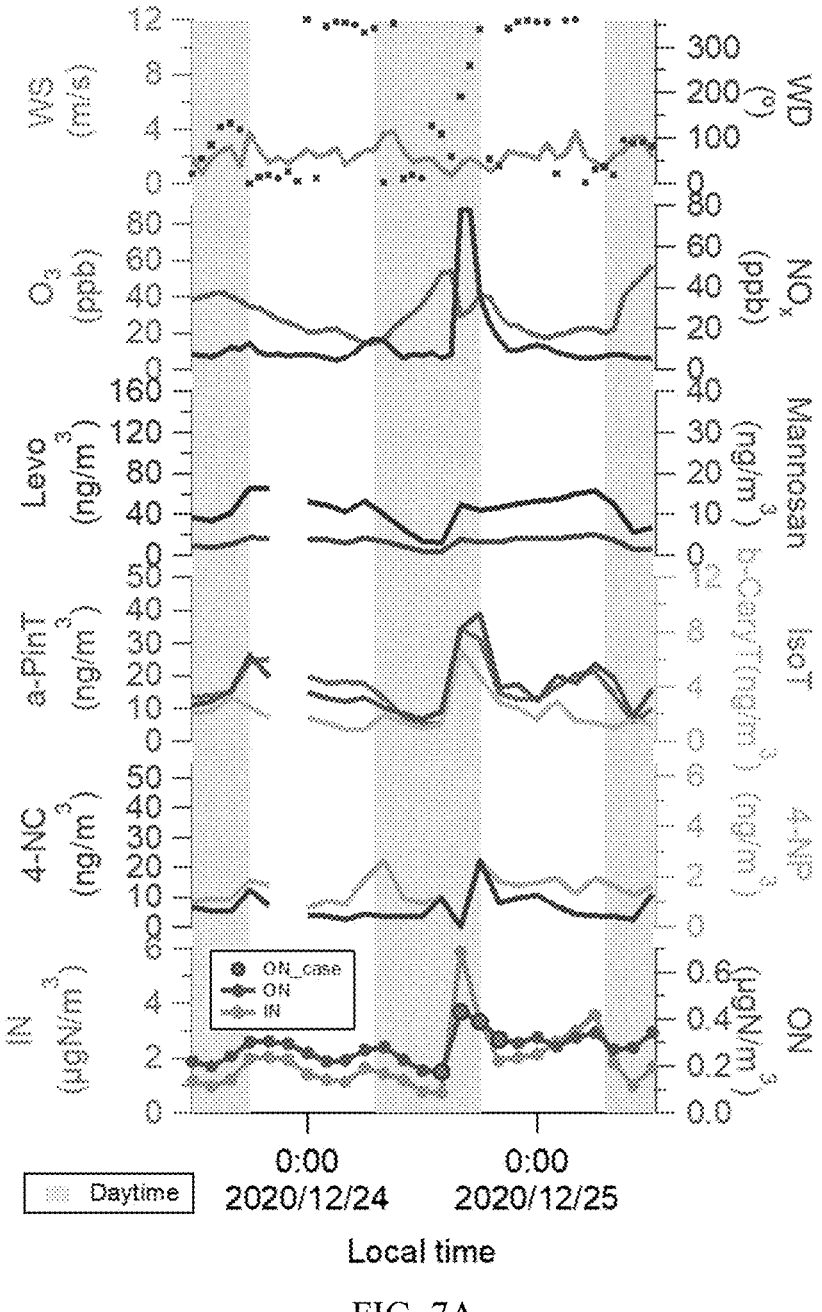
FIGS. 7A-7C depict time series of meteorological conditions, gaseous pollutants, organic molecular tracer species and aerosol inorganic nitrogen and organic nitrogen concentrations at the HKUST site during three case periods, respectively; Levo means levoglucosan, $\alpha$-PinT stands for $\alpha$-pinene secondary organic aerosol (SOA) tracers, IsoT is isoprene SOA tracers, $\beta$-CaryT means $\beta$-caryophyllene SOA tracers; 4-NC is 4-nitrocatechol; 4-NP stands for 4-nitrophenol.
Figure 7B:
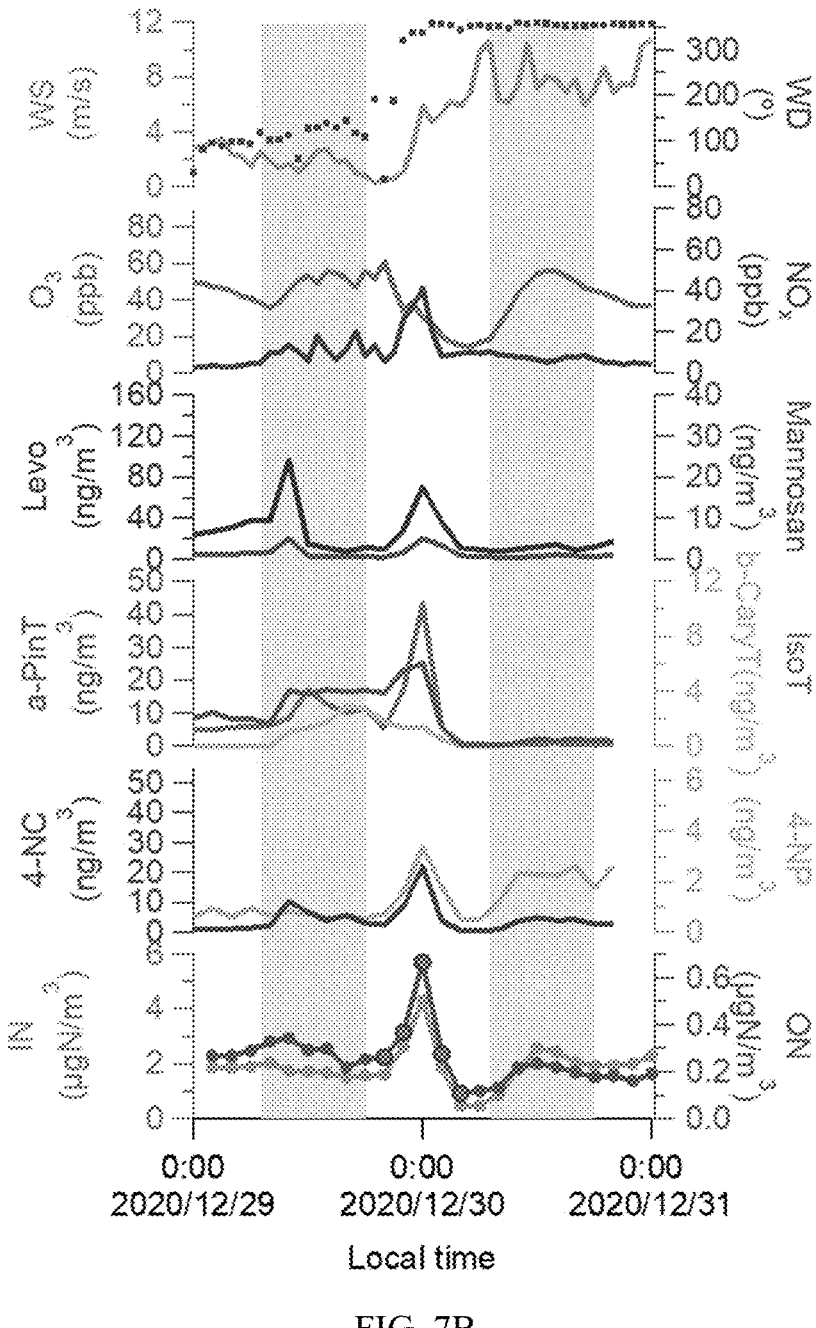
Figure 7C:
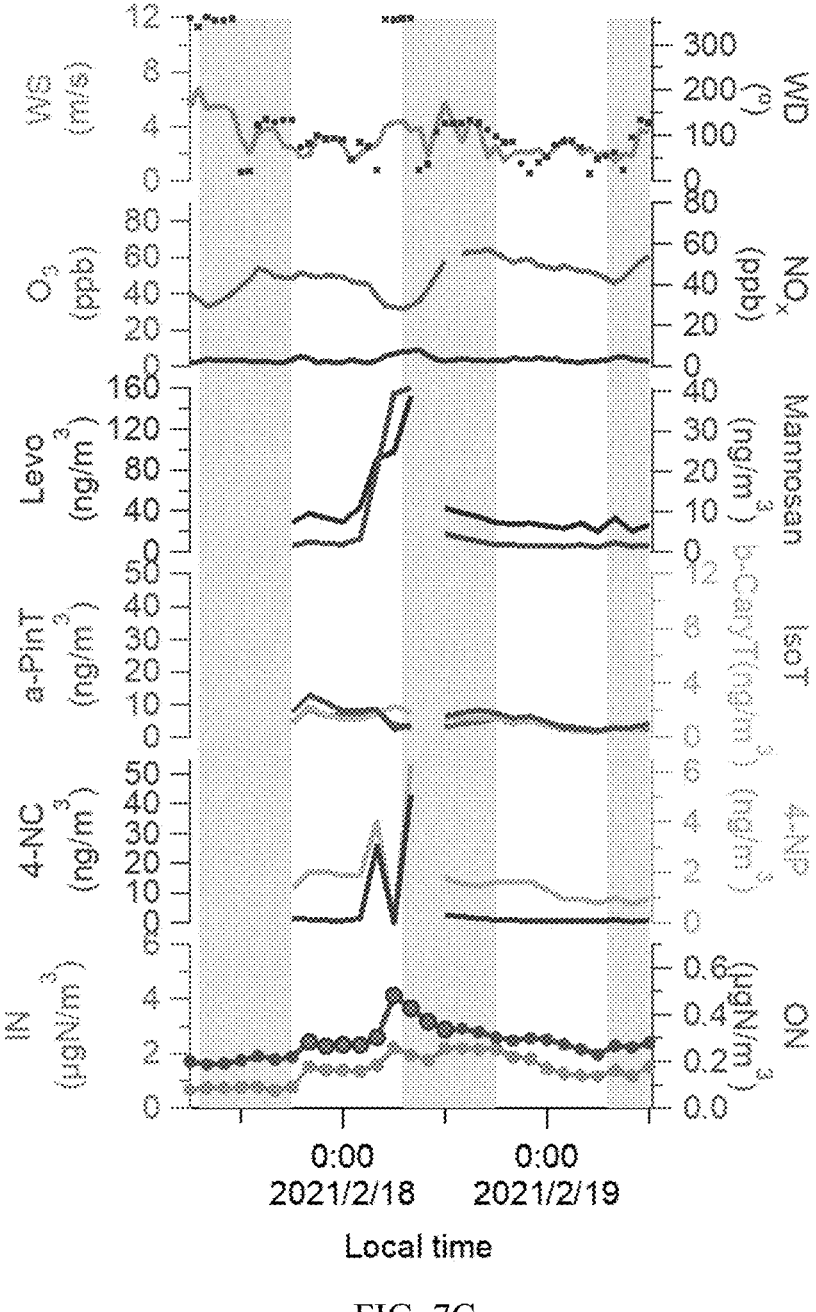

To investigate the influential factors of aerosol ON formation and to demonstrate the utility of online measurements of ON, three short-term high ON episodes are examined, as presented in FIGS. 7A-7C. As shown in FIG. 7A, the first high ON episode occurred during 16:00-20:00 on the Christmas Eve (24 Dec. 2020). Driven by the increased traffic flow on holiday, a surge in $NO_x$ level occurred within hours along with rapid increase in both aerosol IN and ON. During the episode, the wind changed from eastern to southern and southwestern direction, which led to a transition from the relatively clean coastal air masses to the air of higher pollution loading from the nearby urban areas. In the first episodic period, ON is significantly correlated with secondary inorganic nitrogen components, $NH_4^+$—N and $NO_3^-$—N ($R_p$=0.94 and 0.85, respectively) as well as three SOA tracers associated with isoprene, α-pinene, and β-caryophyllene emissions ($R_p$=0.90, 0.91, and 0.96, respectively), indicating the prominent influence from secondary formation processes. As demonstrated by Perring et al. (2013), secondary formation serves as an important source of atmospheric ON aerosols. Similar important contributions from secondary formation processes to the WSON have been observed in northwestern and southern China (Ho et al., 2015; Yu et al., 2017).

In the second case period of high ON episode (FIG. 7B), the dominant wind shifted from southeastern and southern to northern direction with increased wind speed (from <1 m/s to >5 m/s) during the midnight of 29-30 Dec. 2020, bringing air masses from the continental area of mainland China. This episode shows a clear example of nighttime nitrogen production under the influence of biomass burning and secondary formation processes, as suggested by the concomitant rise and fall of ON, levoglucosan, 4-nitrocatechol, 4-nitrophenol, isoprene SOA tracers, and α-pinene SOA tracers.

As shown in FIG. 7C, the third ON episodic case lasted from the late evening of 17 February to the noon of 18 Feb. 2021. Different from the first two experiments with increases of both aerosol IN and ON under high $NO_x$ levels (maximum=78 and 41 ppb, respectively), the third case period is characterized with pronounced ON increment in relatively low $NO_x$ regime (<8 ppb). As reflected by the correlation analysis, biomass burning emissions represent the major source of aerosol ON in the third field experiment ($R_p$=0.80 and 0.94 for ON versus levoglucosan and mannosan, respectively), while contributions from the biogenic SOA formation processes are relatively weak.

Figure 8A:
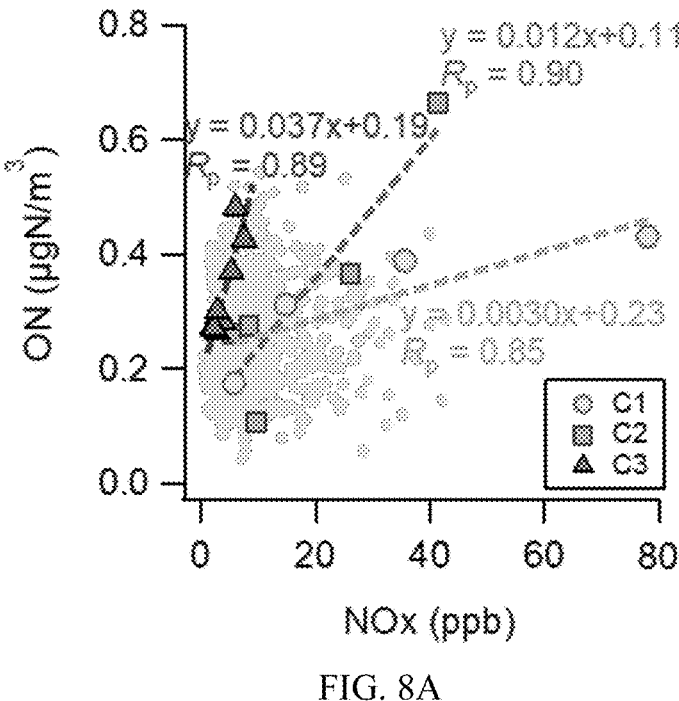
FIGS. 8A-8D are scatter plots of aerosol ON versus different nitrogen-containing species.
Figure 8B:
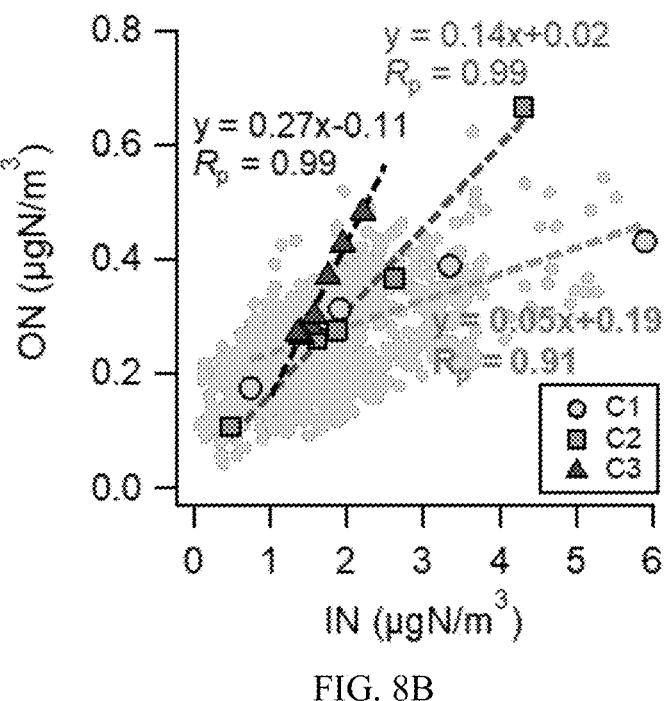
Figure 8C:
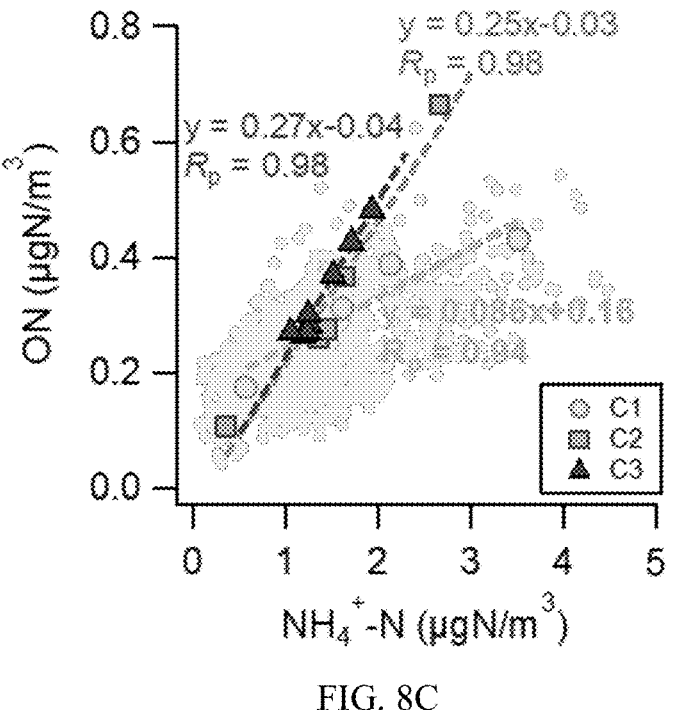
Figure 8D:
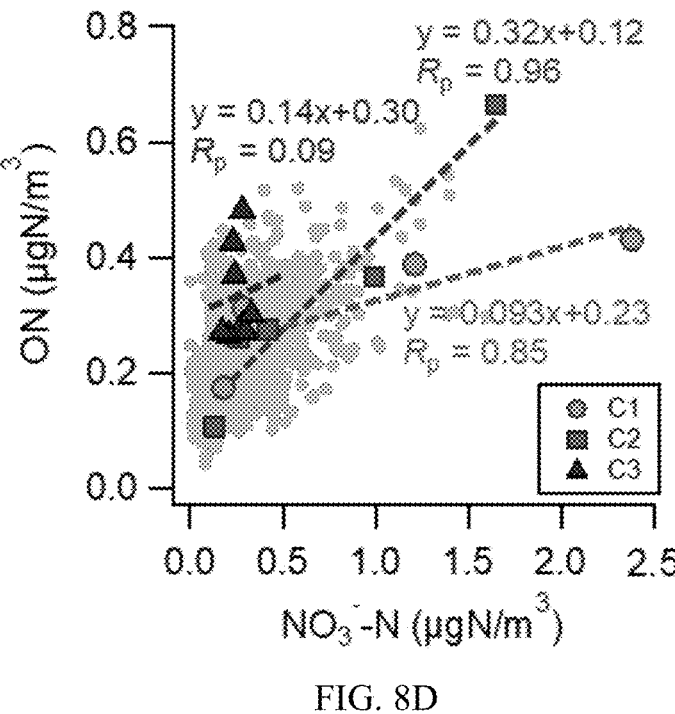

FIGS. 8A-8D present the scatter plots of aerosol ON versus $NO_x$, IN, and two IN species (i.e., $NH_4^+$—N and $NO_3^-$—N) for the entire measurement periods with the data points from the three episodes highlighted. Considering all the data, there are broad positive correlations between ON and all the associated N species, especially with IN and $NH_4^+$—N (FIG. 8C) showing stronger correlations with ON than $NO_x$ (FIG. 8A) and $NO_3^-$—N (FIG. 8D) do. Such results reflect varied precursor-source connections over the five-month observation period. Expectedly, much higher correlations of ON with $NH_4^+$—N , IN, and $NO_x$ are observed for the short periods covering the individual cases due to the more uniform underlying chemical and physical conditions. However, during the third ON episodic case period, there is nearly no correlation between $NO_3^-$—N and ON, showing a case of decoupling of the formation/sources of ON and $NO_3^-$. This demonstrates the values of having high-time resolution of ON measurements. As shown in FIG. 8B, the scatter plots of ON vs IN among all the three case periods also reveal that the relative importance of ON and IN significantly varies under different pollution conditions. The regression slopes of the three episodic cases range from the smallest value of 0.05 in the first case to the largest of 0.27 in the third case. Such results imply that although aerosol IN and ON have certain precursors in common, such as $NO_x$ and $NH_3$, their variations in atmospheric abundance can still be largely different due to the complex primary and secondary source origins of ON and distinct IN and ON formation mechanisms.

Measurement Validation

The present nitrogenous aerosol quantification method is further validated through comparison with the IN measured by the traditional offline analysis with ion chromatography (IC).

During the ambient measurement at HKUST, 6-h filter samples are collected on 47 mm Teflon filters and prebaked quartz filters by using different channels of a Speciation Air Sampling System (SASS, Met ONE Instruments Inc., USA) at the sampling flow rate of 6.7 L/min. The offline $PM_{2.5}$ filter samples are extracted by the double de-ionized water in an ultrasonic ice-water bath and filtered through a 0.45 μm syringe filter. Water-soluble ions are analyzed using an IC system (Dionex DX-500, Thermo Fisher Scientific, USA) following the standard procedure known in the art.

Figure 9A:
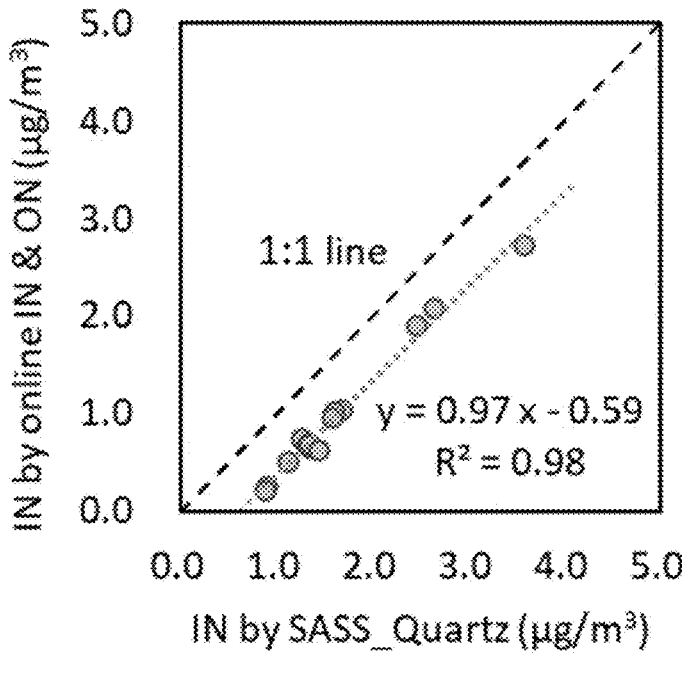
FIGS. 9A-9C show comparisons between the aerosol IN concentrations measured by the present online inorganic and organic nitrogen quantification method and the traditional ion chromatography (IC) analysis.
Figure 9B:
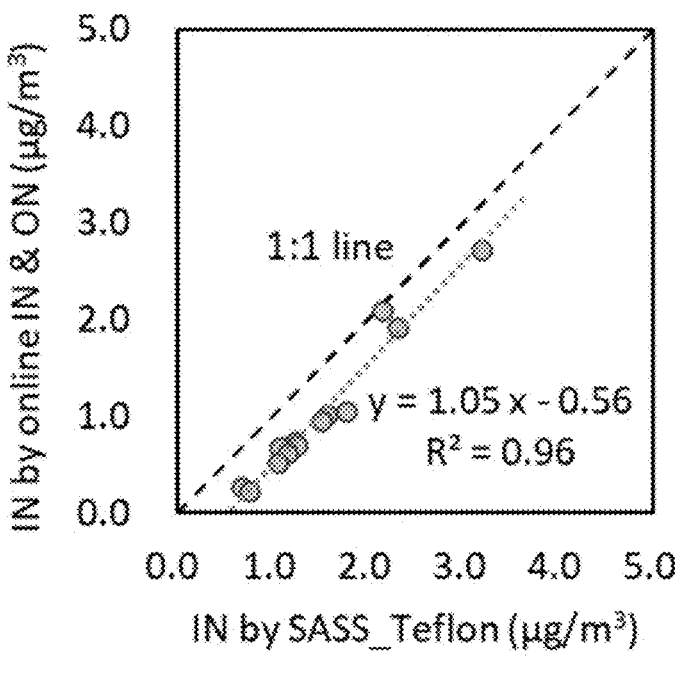
Figure 9C:
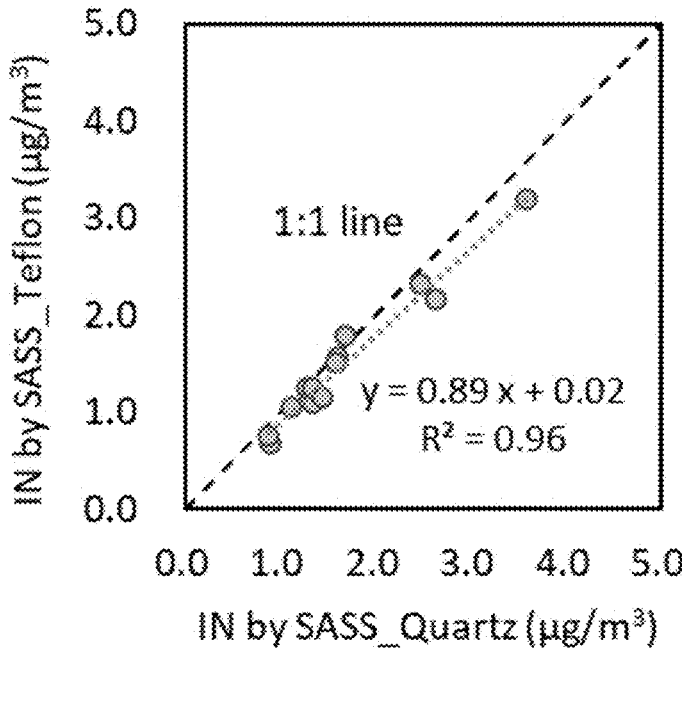

A total of 15 groups of 6-h data points are obtained by the offline quartz filters and the offline Teflon filters. The hourly IN data of the online IN & ON analyzer system in the corresponding time periods are averaged for comparison with the offline data. The aerosol IN filtered by the quartz and Teflon filters are highly correlated ($R^2$=0.96), with a slope value of 0.89±0.05 (FIG. 9C). As shown in FIGS. 9A and 9B, the aerosol IN determined by the online method is strongly correlated with those determined by the offline method ($R^2$=0.98, slope=0.97 for samples collected on quartz filters; $R^2$=0.96, slope=1.05 for samples collected on Teflon filters).

The regression slopes for IN measured online versus offline with filters fall into a close range around 1.0, demonstrating the good performance of aerosol IN quantification by the present invention. There are several reasons for the discrepancies between the two methods: (1) a parallel-plate filter denuder is installed upstream of the online atmosphere nitrogen quantification system to minimize the interference from semi-volatile species (e.g., $NH_4NO_3$). In contrast, the SASS system sampled directly without a denuder, consequently introducing the positive adsorption artifacts; (2) filter face velocity, defined as the volumetric flow rate divided by the exposed area of the filter, influences the vapor adsorption onto the filter medium. A previous study demonstrated the face velocity effects on vapor adsorption artifact in the sampling of organic aerosols (McDow and Huntzicker, 1990). IN measurements may also have similar face velocity dependence caused by adsorption of gas-phase $HNO_3$ on the quartz filter. With the similar volumetric flow rate (8.0 vs. 6.7 L/min) but much smaller filter deposit area (1.23 cm² vs. 13.8 cm²), the online system has a filter face velocity ~13 times that of the offline sampling system, leading to less interference from gases. Such characteristics could be even more critical for ON measurement; (3) the filter-based sampling followed by offline laboratory analysis experiences a longer period of gas-particle partitioning and chemical equilibrium during the storage and conditioning process; and (4) the inexact matching of the sampling schedules between the offline (continuous 6-h) and the online (the actual sampling time is 3 h in the 6-h period) sampling may also contribute to the discrepancies in IN determination.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. An atmospheric aerosol inorganic and organic nitrogen quantification method, comprising:

sampling an ambient air by drawing it though an inlet to obtain an air sample;

reducing positive artifacts caused by the adsorption of gas-phase compounds of the air sample by a parallel-plate filter denuder;

filtering the air sample to collect an aerosol product;

thermally evolving the aerosol product through a stepwise temperature program to obtain a gaseous product mixture, wherein the stepwise temperature program is a heating program with a plurality of progressive heating temperatures;

oxidizing the gaseous product mixture with an oxygen-containing carrier gas to generate oxidized gaseous products, wherein the gaseous product mixture is oxidized to the oxidized gaseous products under 840-870° C. in the presence of oxygen and $MnO_2$ catalyst, and wherein the oxidized gaseous products comprise a $CO_2$ product and nitrogen oxides products and the oxidized gaseous products are split and subjected into two paths, wherein one path is directed to a carbon detector for detecting a carbon amount and generating a C signal and the other path is directed to a NOx analyzer comprising a NO convertor for transforming the nitrogen oxides products into an NO product;

forming the NO product from the nitrogen oxides products in the NO converter;

reacting the NO product with ozone to produce an excited $NO_2$* molecule for causing a chemiluminescent reaction; and detecting and quantifying a fluorescence emitted during the chemiluminescent reaction to obtain an intensity value of the fluorescence;

wherein the intensity value of the fluorescence represents a total nitrogen mass concentration as a N signal of ambient nitrogenous aerosols.

2. The method of claim 1, wherein the inlet has an aerosol size cut cyclone and the ambient air is drawn at a flow rate of at least 8.0 L/min.

3. The method of claim 1, wherein the plurality of progressive heating temperatures comprises: 150° C., 180° C., 300° C., 400° C., 500° C. and 800° C.

4. The method of claim 1, wherein the carbon detector is a non-dispersive infra-red (NDIR) detector that monitors CO2 product and measures the carbon amount of the $CO_2$ product to generate the C signal or a flame ionization detector (FID) that converts the $CO_2$ product to a $CH_4$ product and measures the carbon amount of the $CH_4$ product to generate the C signal.

5. The method of claim 4, wherein a C/N signal ratio is calculated to evaluate whether the N signal is dominated by inorganic nitrogen or organic nitrogen.

6. The method of claim 5, wherein the C signal and N signal are processed to resolve overlapping peaks by using a multivariate curve resolution (MCR) tool.

7. The method of claim 1, wherein the NO convertor is a molybdenum convertor.

8. The method of claim 1, wherein a flow-adjustable needle valve is deployed on the path to the $NO_x$ analyzer.

9. The method of claim 1, wherein a calibration curve is constructed by a standard solution containing both carbon and nitrogen.

10. An atmospheric aerosol inorganic and organic nitrogen quantification system, comprising:

an inlet for intaking atmospheric air samples;

a denuder for reducing positive artifacts caused by the adsorption of gas-phase compounds of the atmospheric air samples to obtain an aerosol product;

tandem aerosol sample heating ovens having a front oven for thermally evolving the aerosol product by a stepwise temperature heating program to obtain a gaseous product mixture and a back oven for oxidizing the gaseous product mixture with an oxygen-containing carrier gas to generate oxidized gaseous products, wherein the stepwise temperature program is a heating program with a plurality of progressive heating temperatures;

a carbon detector for performing carbon measurement of a portion of the oxidized gaseous products;

a NOx analyzer having a NO convertor for converting another portion of the oxidized gaseous products into an NO product;

a needle valve for adjusting a flow rate of the oxidized gaseous products subjected to the $NO_x$ analyzer;

an ozonator for generating ozone;

a reaction chamber for reacting the NO product with the ozone to produce excited NO2* molecules which emit fluorescence light for quantification; and a fluorescence quantification module for evaluating and quantifying the fluorescence light to obtain a fluorescence intensity and correlating the fluorescence intensity to a concentration of the excited NO2* molecules;

wherein the tandem aerosol sample heating ovens are connected to the carbon detector, the tandem aerosol sample heating ovens are also connected to the NOx analyzer through the needle valve; and wherein the reaction chamber is connected to the ozonator, the NO convertor and the fluorescence quantification module.

11. The system of claim 10, wherein the inlet has an aerosol size cut cyclone and intakes the atmospheric air samples at a flow rate of at least 8.0 L/min.

12. The system of claim 10, wherein the denuder is a parallel plate filter denuder.

13. The system of claim 10, wherein the oxygen-containing carrier gas is $He/O_2$.

14. The system of claim 10, wherein the NO convertor is a molybdenum catalytic convertor.

15. The system of claim 10, wherein the carbon detector is a nondispersive infrared detector or a flame ionization detector.

16. The system of claim 10, wherein the system further comprises a data logging module for analyzing, calculating, and saving the fluorescence intensity, a temperature control module for adjusting and controlling the stepwise temperature heating program of the front oven and the temperature of back oven, and a controller to control the data logging module and the temperature control module.

* * * * *